United States Patent
Kozhuharov (10) Patent No.: US 9,465,726 B2
(45) Date of Patent: Oct. 11, 2016

(54) ABSTRACT LAYER FOR AUTOMATIC USER INTERFACE TESTING

(71) Applicant: VMWare, Inc., Palo Alto, CA (US)

(72) Inventor: Danail Ivanov Kozhuharov, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 320 days.

(21) Appl. No.: 13/910,198

(22) Filed: Jun. 5, 2013

(65) Prior Publication Data

US 2014/0366005 A1    Dec. 11, 2014

(51) Int. Cl.
*G06F 9/44* (2006.01)
*G06F 3/00* (2006.01)
*G06F 11/36* (2006.01)
*G06F 11/34* (2006.01)
*G06F 9/455* (2006.01)

(52) U.S. Cl.
CPC ....... *G06F 11/3696* (2013.01); *G06F 11/3414* (2013.01); *G06F 11/3664* (2013.01); *G06F 11/3668* (2013.01); *G06F 8/30* (2013.01); *G06F 9/4443* (2013.01); *G06F 9/45512* (2013.01)

(58) Field of Classification Search
CPC ............. G06F 11/3604; G06F 11/368; G06F 11/3696; G06F 11/3414; G06F 11/3684; G06F 8/30; G06F 11/3664; G06F 11/3668; G06F 11/3692; G06F 11/3688; G06F 11/3676; G06F 9/4443; G06F 9/443; G06F 9/45512
See application file for complete search history.

(56) References Cited

U.S. PATENT DOCUMENTS

| | | | | |
|---|---|---|---|---|
| 5,475,843 A * | 12/1995 | Halviatti | ............. | G06F 9/45512 717/108 |
| 5,600,789 A * | 2/1997 | Parker | ................. | G06F 11/3688 714/38.11 |
| 5,634,002 A * | 5/1997 | Polk | ..................... | G06F 11/3688 714/38.14 |
| 5,781,720 A * | 7/1998 | Parker et al. | ............... | 714/38.11 |
| 5,983,001 A * | 11/1999 | Boughner | ........... | G06F 9/45512 714/38.1 |
| 7,310,798 B1 * | 12/2007 | Gunara | ............... | G06F 11/3664 717/124 |
| 7,490,319 B2 * | 2/2009 | Blackwell | ........... | G06F 11/3664 717/124 |
| 7,752,607 B2 * | 7/2010 | Larab | ..................... | G06Q 10/10 717/135 |
| 8,276,123 B1 * | 9/2012 | Deng | .................... | G06F 11/368 714/37 |
| 8,549,478 B2 * | 10/2013 | Amichai | ............. | G06F 11/3668 717/124 |

(Continued)

OTHER PUBLICATIONS

Emil Borjesson et al., Automated System Testing using Visual GUI Testing Tools: A Comparative Study in Industry, IEEE 2012, [Retrieved on Mar. 16, 2016]. Retrieved from the internet: <URL: http://ieeexplore.ieee.org/stamp/stamp.jsp?tp=&arnumber=6200127> 10 Pages (350-359).*

(Continued)

*Primary Examiner* — Thuy Dao
*Assistant Examiner* — Anibal Rivera (57) ABSTRACT

A method to provide automatic testing of a graphical user interface (GUI) having a plurality of GUI components includes maintaining an abstract layer configured to provide a uniform interface for accessing a plurality of user interface (UI) testing tools, each of which is configured to interact with one or more of the plurality of GUI components to perform automatic testing of the GUI. The method also includes receiving a test command, selecting one of the plurality of UI testing tools based on the test command, identifying the GUI component from the plurality of GUI components based on a first uniform identifier in the test command, and utilizing the uniform interface to communicate with the selected UI testing tool for interacting with the GUI component based on the test command.

18 Claims, 6 Drawing Sheets

(56) References Cited

U.S. PATENT DOCUMENTS

| | | | | |
|---|---|---|---|---|
| 8,984,339 B2* | 3/2015 | Ahmed | ............... | G06F 11/3684 714/32 |
| 2003/0098879 A1* | 5/2003 | Mathews | ............ | G06F 11/3688 715/762 |
| 2003/0164854 A1* | 9/2003 | Polk | .................... | G06F 11/3676 715/762 |
| 2003/0182468 A1* | 9/2003 | Iline | ........................ | G06F 9/542 719/318 |
| 2004/0268311 A1* | 12/2004 | Pizzoli | ................ | G06F 9/4443 717/124 |
| 2007/0136024 A1* | 6/2007 | Moser | ................. | G06F 11/3688 702/119 |
| 2007/0168745 A1* | 7/2007 | Alam | .................. | G06F 11/3414 714/38.14 |
| 2008/0127097 A1* | 5/2008 | Zhao | ................... | G06F 11/3684 717/124 |
| 2008/0155515 A1* | 6/2008 | Stewart | ............... | G06F 11/3664 717/135 |
| 2008/0282230 A1* | 11/2008 | Belvin | ................ | G06F 11/3692 717/125 |
| 2008/0295076 A1* | 11/2008 | McKain | ............... | G06F 9/4443 717/124 |
| 2009/0037881 A1* | 2/2009 | Christy | ............... | G06F 11/3684 717/124 |
| 2009/0077422 A1* | 3/2009 | Khaladkar | .......... | G06F 11/3684 714/33 |
| 2009/0089688 A1* | 4/2009 | Zhao | ................... | G06F 11/3684 715/762 |
| 2011/0131551 A1* | 6/2011 | Amichai | ............. | G06F 11/3668 717/125 |
| 2011/0214107 A1* | 9/2011 | Barmeir | ............. | G06F 11/3684 717/125 |
| 2011/0282642 A1* | 11/2011 | Kruger | ................ | G06F 11/3668 703/27 |
| 2011/0307860 A1* | 12/2011 | Park | ......................... | G06F 8/30 717/107 |
| 2011/0307864 A1* | 12/2011 | Grechanik | .......... | G06F 11/3696 717/124 |
| 2012/0174069 A1* | 7/2012 | Zavatone | ............ | G06F 11/3692 717/124 |
| 2013/0061206 A1* | 3/2013 | Smith | .............. | G01R 31/31912 717/109 |
| 2013/0074043 A1* | 3/2013 | Fu | ........................ | G06F 11/3684 717/125 |
| 2013/0117731 A1* | 5/2013 | LeSuer | ............... | G06F 11/3668 717/125 |

OTHER PUBLICATIONS

Cuixiong Hu et al., Automating GUI Testing for Android Applications, May 2011, ACM 978-1-4503-0592, [Retrieved on Mar. 16, 2016]. Retrieved from the internet: <URL: http://www.cs.ucr.edu/~neamtiu/pubs/ast11hu.pdf> 7 Pages (1-7).*

* cited by examiner

ABSTRACT LAYER FOR AUTOMATIC USER INTERFACE TESTING

BACKGROUND

Automatic software testing refers to the process of testing software using an automatic testing tool. The automatic testing tool may control the execution of the software, compare the actual behaviors of the software with the predicted outcomes, and determine whether the software has any bugs or issues. To test a software's graphical user interface (GUI), the automatic testing tool may generate simulated user actions such as keystrokes and mouse clicks as inputs to the GUI, observe the behavior of the GUI, and validate whether the observed behavior is as predicted. Automatic software testing is an important procedure for improving the overall quality of software, and is cost-effective because the test cases may be repeatedly executed. Nonetheless, implementing the test cases may require a large amount of upfront efforts, and the test cases may not be portable to a different piece of software or a different automatic testing tool.

Since GUI software is designed for human access, it is often hard to simulate all the user actions that can be performed on the GUI. Therefore, the conventional GUI automatic testing tools are more focused on the displayed components in the GUI, while ignoring the testing of structure and organization of the software. When software becomes more and more sophisticated, and the GUI utilizes multiple technologies in multiple environments, the number of test scenarios increases as well. As a result, developing automatic test cases are often conducted by copy-paste instead of code reuse. Also, maintaining the test cases become a burden when the tightly-coupled test code causes heavy code dependencies.

SUMMARY

Systems and methods for providing automatic software testing of a graphical user interface are described. The system may contain a plurality of user interface (UI) testing tools executing on a computer system. Each of the plurality of UI testing tools may be configured to interact with one or more of the plurality of GUI components to perform automatic testing of the GUI. The system may contain an abstract layer coupled with the plurality of UI testing tools. The abstract layer may be configured to provide a uniform interface for accessing the plurality of UI testing tools. The system may further contain an automatic test platform coupled with the abstract layer and configured to issue a test command to the abstract layer simulating a user action performed on a GUI component of the plurality of GUI components. The abstract layer may be configured to identify the GUI component based on a first uniform identifier in the test command and utilize the first uniform identifier to communicate with one of the plurality of UI testing tools for interacting with the GUI component.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

The present disclosure provides a framework for performing automatic user interface testing (hereinafter "automatic UI testing framework"). The automatic UI testing framework may include automation tools, abstraction layers, design patterns, and project blueprints. The automatic UI testing framework may create a friendly and intuitive development environment for the test developers, allow natural mitigation of the common automation problems, and has short on-board time for new test developers with opportunities for gradual improvements.

Figure 1:
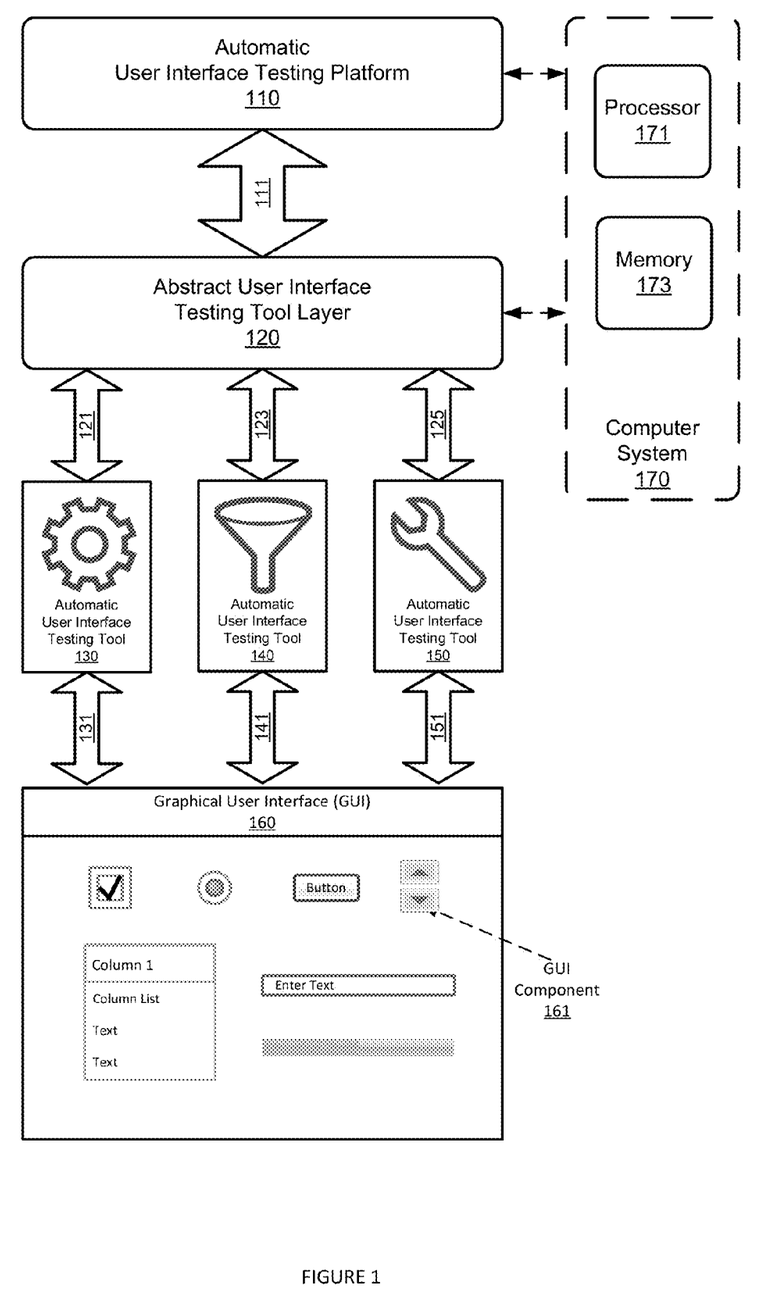
FIG. 1 illustrates an automatic testing framework configured to provide a uniform approach for testing a graphical user interface.

FIG. 1 illustrates an automatic testing framework configured to provide a uniform approach for testing a graphical user interface, according to one or more embodiments of the present disclosure. In FIG. 1, one or more automatic user interface testing tools (hereinafter "UI testing tools") 130, 140, and 150 may be configured to perform automatic testing of a graphical user interface (hereinafter "GUI") 160. An abstract user interface testing tool layer (hereinafter "abstract layer") 120 may provide a uniform and abstract interface for an automatic user interface testing platform 110 (hereinafter "UI testing platform") in accessing the UI testing tools 130, 140, and 150, and in conducting automatic testing of the GUI 160.

In one embodiment, the GUI 160 may be an image-based human-computer interface of a software application executing in a desktop operating system (e.g., Microsoft® Windows®, MacOS®, or UNIX® X, etc) or a mobile operating system (e.g., Android®, Symbian®, Blackberry OS®, Palm®, iOS®, etc.). The GUI 160 may also be an interface of a web-based application displayed in a web browser such as Microsoft Internet Explorer®, Firefox®, etc. The GUI 160 may contain windows, menus, icons, and other image-based components that can be used to interact with the software application. Specifically, the GUI 160 may contain one or more GUI components 161 that are configured to display various types of data, and may be manipulated using a mouse device and/or a keyboard device. Examples of GUI components 161 may include, without limitation, text, image, checkbox, select-box, drop-box, button, text field, icon, menu, menu item, outline field, list field. The GUI 160 may be developed based on one or more user interface technologies such as Java®, Apache® Flex, HTML®, C#®, etc. The GUI 160 may also adopt multiple GUI technologies and/or operating on multiple environments.

In one embodiment, the UI testing tools 130, 140, and/or 150 may be utilized to perform user interface testing, functional testing, internationalization (e.g., I18N) testing, and/or localization (e.g., L10N) testing. Further, these UI testing tools may be utilized to perform regression tests or build acceptance tests to improve software development processes. The UI testing tools may be configured to simulate a user's actions in interacting with the GUI 160 and its GUI components 161. Specifically, these UI testing tools may utilize scripts and/or high-level programming language (PL) to define the user actions that can be performed on the GUI components 161. During testing, these UI testing tools may simulate a user pressing a button or input a string into a text field by executing the scripts and/or the high-level PL codes.

In one embodiment, each of the UI testing tools 130, 140, and 150 may have its own tools, scripting languages, and programming languages, and may support various UI technologies. The abstract layer 120 may decouple the UI testing platform 110 from these various UI testing tools 130, 140, and 150, as well as these different UI technologies. For example, the UI testing tool 130 may be a script-based testing tool configured to support web-based user interfaces, and the UI testing tool 140 may be a high-level PL-based testing tool configured to test WINDOW based user interfaces. Thus, the UI testing tools 130, 140, and 150 may be standalone software applications executing independently and operating externally with respect to the abstract layer 120. And the abstract layer 120 may be configured to provide a set of uniform services to the UI testing platform 110 for interacting with each of the UI testing tools 130, 140, and 150 via communication channels 131, 141, and 151. Each of the communication channels 131, 141, and 151 may utilize one or more communication protocols, such as, without limitation, HTML®, REST®, SOAP®, RMI®, etc.

In one embodiment, the UI testing platform 110 may be configured to build and maintain a test development environment, and utilize the abstract layer 120 for automatic testing of the GUI 160. The UI testing platform 110 may employ the set of uniform services provided by the abstract layer 120 to generate a common testing project, regardless of which of the UI testing tools 130, 140, or 150 is used to test the GUI 160, or what type of UI technologies the GUI 160 is implemented in. Thus, the common testing project, which may contain testing codes in scripts and/or high-level PL, may stay substantially the same over time, even when the UI testing tools are changed or the GUI 160 are updated. Further, the UI testing platform 110 may reuse knowledge and codes obtained during the development of a first testing project for a second testing project, thereby saving the time and efforts in developing the second testing project. Thus, the abstract layer 120 may allow the building of a higher-level abstract testing platform 110, which may achieve tested-product independence.

In one embodiment, the abstract layer 120 may provide a uniform identifier service for identifying a specific GUI component 161. The abstract layer 120 may provide an abstract test automation interface and uniform tool services for accessing and control any one of the UI testing tools 130, 140, and 150. Specifically, the abstract layer 120 may automatically route the calls received from the UI testing platform 110 to the corresponding UI testing tools 130, 140, and/or 150. The details of the abstract layer 120 and its various services are further described below.

In one embodiment, the UI testing platform 110 and the abstract layer 120 may be implemented by a computer system 170 or software running on the computer system 170. The computer system 170 may contain, among other components, a processor 171 and memory 173. The UI testing platform 110 and the abstract layer 120 may be implemented as a set of non-transitory machine-executable instructions that can be stored in the memory 173 and executed by the processor 171. Alternatively, the UI testing platform 110 and the abstract layer 120 may be implemented as one or more hardware modules in the computer system 170.

Figure 2:
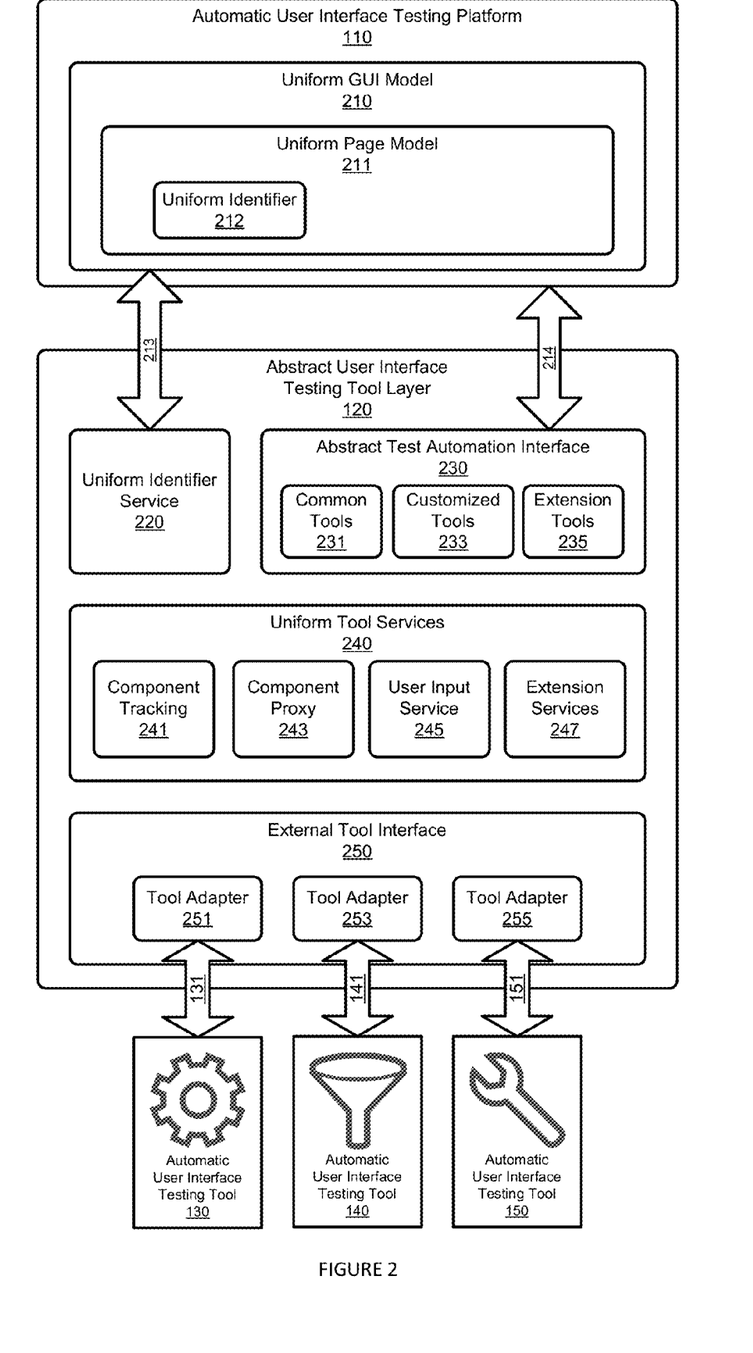
FIG. 2 illustrates an automatic testing system configured to access one or more automatic user interface testing tools for user interface testing.

FIG. 2 illustrates an automatic testing system configured to access one or more automatic user interface testing tools for user interface testing, according to some embodiments of the present disclosure. In FIG. 2, the automatic user interface testing platform (hereinafter "UI testing platform") 110 may correspond to the UI testing platform 110 of FIG. 1. The abstract user interface testing tool layer (hereinafter "abstract layer") 120, which may correspond to the abstract layer 120 of FIG. 1, may be configured to contain, among other components/modules, a uniform identifier service 220, an abstract test automation interface 230, uniform tool services 240, and an external UI tool interface 250. Further, the external UI tool interface 250 may be configured with a set of tool adapters 251, 253, and 255. The abstract layer 120 may utilize the tool adapters 251, 253, and 255 to interact with the automatic user interface testing tools (hereinafter "UI testing tools") 130, 140, and 150 (corresponding to the UI testing tools 130, 140, and 150 of FIG. 1), via communication channels 131, 141, and 151, respectively.

In one embodiment, the UI testing platform 110 may be configured to adopt one or more uniform GUI models 210 to represent a GUI and its associated GUI components (the GUI and its GUI components are not shown in FIG. 2). The uniform GUI model 210 may be deemed an abstract data object configured to "describe" the GUI and the GUI components. Further, the UI testing platform 110 may utilize the uniform GUI model 210 to uniformly describe, access, and interact with, the GUI and the GUI components that may be implemented using various UI technologies. When developing an automatic test application, the UI testing platform 110 may adopt a high-level PL and construct the uniform GUI model 210 using the same high-level PL. Thus, there is no need to create and use proxy classes that are directly tied to the structures and UI technologies of the GUI and the GUI components. Further, when the GUI and its GUI components are changed, the uniform GUI model 210 used for accessing the GUI and the GUI components may remain the same. Therefore, the uniform GUI model 210 may bring script-based advantages to a high-level PL-based UI testing platform 110 in terms of data structure decoupling.

In one embodiment, the goal of simplifying usage during test-development and simplifying maintenance when the GUI and GUI components are changed may be achieved by using one or more uniform identifiers 212 as the building blocks for the uniform GUI model 210 and/or the uniform page model 211. Similar to the utilizing of a conventional GUI model (which has data structures that mirror the structures of the GUI and its GUI components) to retrieve GUI properties and control GUI actions, the UI testing platform 110 may utilize the uniform identifiers 212 to accomplish the same tasks. During automatic test development, the UI testing platform 110 may program the uniform identifiers 212 with identification information. During run time, the UI testing platform 110 may request the uniform identifier service 220 to generate the uniform identifiers 212, and request the abstract test automation interface 230 to locate the identified GUI components based on the uniform identifiers 212. Alternatively, the UI testing platform 110 may use the uniform GUI model 210 and/or the uniform page model 211 as a resource to obtain additional uniform identifiers 212 before calling the abstract test automation interface 230. The details about the uniform identifier 212 and the uniform identifier service 220 are further described below.

In one embodiment, the UI testing platform 110 may utilize the abstract automation interface 230 to issue test commands to (or obtain property values via) the UI testing tools 130, 140, and 150. Specifically, the abstract test automation interface 230 may be implemented by grouping the functionalities of the UI testing tools 130, 140, and 150 into functional sets, including, without limiting, common tools 231, customized tools 233, and extension tools 235. The common tools 231 may contain tools handling simple GUI component automations and common user input functionalities involving e.g., buttons, labels, mouse, and/or keyboard inputs. The customized tools 233 may handle composite GUI components such as tables, trees, and/or handle scrollable containers. The extension tools 235 may include specialized tools that support the development and debugging of the automatic UI test codes in the UI testing platform 110. For example, the extension tools 235 may contain a tool that can record the structure and the component properties of a current GUI component. During automatic test case development, such a tool may be called to collect a GUI component's identification data. During automatic test case execution, such a tool may be invoked to obtain a particular GUI state for debugging purposes.

In one embodiment, the functional sets in the abstract test automation interface 230 may be supported by services provided by the uniform tool services 240. The uniform tool services 240 may be configured with, among other modules, a component tracking module 241, a component proxy module 243, a user input module 245, and other extension services modules 247 (which implement functionalities that support, e.g., test design and debugging). To perform their respective functionalities, the modules in the uniform tool services 240 may collaborate with each other, and may communicate with the external tool interface 250. For example, to serve a test command request originated from the UI testing platform 110, the uniform tool services 240 may have a set of rules for selecting an appropriate tool adapter from the external tool interface 250. The uniform tool services 240 may either statically configure, or query at run-time, the external tool interface 250 to determine which of the UI testing tools 130, 140, and 150, and the corresponding tool adapters 251, 253, and 255, should be utilized to perform the test command request.

In one embodiment, the component tracking module 241 of the uniform tool services 240 may be configured to track a GUI component in the current screen rendering. That is, given a uniform identifier 212, other modules in the uniform tool services 240 (e.g., the component proxy module 243) may utilize the component tracking module 241 to determine which GUI components should be taken control of. The component proxy module 243 of the uniform tool services 240 may be configured to create one or more uniform proxies. Given a uniform identifier 212, the component proxy module 243 may facilitate GUI component interactions and cache some of the GUI component properties.

In one embodiment, the user input service module 245 may be configured to simulate user inputs from different devices such as keyboard, mouse, and/or touch screen. For example, the user input service module 245 may receive a uniform identifier 212, and utilize the component tracking module 241 to locate the GUI component identified by the uniform identifier 212. Afterward, the user input service module 245 may transmit a simulated user input (e.g., mouse interaction, keyboard interaction, clip-board interaction) to the identified GUI component. In another example, the user input service module 245 may receive a GUI component's screen location data, and use the screen location data to direct the simulated user input. The user input service module 245 may also simulate a user input designed for whichever GUI component in the GUI that has the focus during run-time.

In one embodiment, the UI tool adapters 251, 253, and 255 may be configured to provide uniform access to the functionalities of the external UI testing tools 130, 140, and 150, respectively. Each of the UI tool adapters 251, 253, and 255 may include mechanisms to convert data and interpret commands, both of which are received from other components in the abstract layer 120. Further, the UI tool adapters 251, 253, and 255 may be configured to convert response data returned from the UI testing tools 130, 140, and 150, and transmit the converted response data to the other components in the abstract layer 120.

In one embodiment, the abstract layer 120 may provide stateless and atomic-operation services to the UI testing platform 110. An "atomic operation" may contain a set of actions to be performed sequentially and/or logically by the abstract layer 120 as a whole. For example, the abstract test automation interface 230 may receive from the UI testing platform 110 a first test command with optional data via a communication channel 214. The abstract test automation interface 230 may transmit the first test command to the uniform tool services 240 for further processing. Afterward, the abstract test automation interface 230 may transmit a first return message returned from the uniform tool services 240 back to the UI testing platform 110 as a response to the first test command. Thus, the above sequence of actions may be deemed a first atomic operation. In a subsequent atomic operation, the UI testing platform 110 may transmit a second test command to the abstract test automation interface 230, and forward a second return message from the abstract test automation interface 230 back to the UI testing platform 110 in response to the second command.

In one embodiment, the abstract layer 120 may maintain a stateless environment between the first atomic operation and the second atomic operation. In other words, the abstract layer 120 may not temporarily store in memory transactional data from the first atomic operation which may be used by the second atomic operation. Thus, upon the completion of the first atomic operation, the abstract layer 120 may clear/discard the transactional data associated with the first atomic operation, and perform the subsequent second atomic operation as if the first atomic operation is never performed. In another embodiment, the abstract layer 120 may cache the GUI component properties in uniform proxies beyond the executing of an atomic operation. In this case, the abstract layer 120 may temporarily store transactional data from the first atomic operation which may be used by the second and/or subsequent atomic operations.

In one embodiment, the abstract layer 120 may implement an atomic operation to ensure that no new screen rendering may be triggered by any other actions except the last action in the atomic operation. In other words, the last action of the atomic operation may trigger a new screen rendering for the GUI, but not the actions before the last action. In one embodiment, the abstract layer 120 may perform an atomic operation which contains no simulated user action. In another embodiment, the abstract layer 120 may implement an atomic operation with one simulated user action being at the end of a sequence of actions. In a further embodiment, the abstract layer 120 may implement an atomic operation with multiple data retrieving actions, as long as none of these data retrieving actions trigger new screen rendering. Also, the abstract layer 120 may implement an atomic operation with multiple calls to the uniform tool services 240, or with multiple invocations of more than one of the UI testing tools 130, 140, and 150.

In one embodiment, the abstract layer 120 may utilize the uniform identifier service 220 to create and support the uniform identifier 212. For example, when the UI testing platform 110 requests a uniform identifier 212, the uniform identifier service 220 may be configured to construct an instance of the uniform identifier 212 based on identification information supplied by the UI testing platform 110, and transmit the instantiated uniform identifier 212 to the UI testing platform 110 via a communication channel 213. Afterward, the UI testing platform 110 may transmit the received uniform identifier 212 with a test command to the abstract test automation interface 230, which in turn may perform a corresponding atomic operation based on the test command. For example, once a specific GUI component is identified based on the uniform identifier 211, the abstract layer 120 may perform an atomic operation to check whether the specific GUI component exists in the GUI, to request for retrieval of a property of the specific GUI component, or to invoke a mouse or keyboard action on the specific GUI component.

Figure 3A:
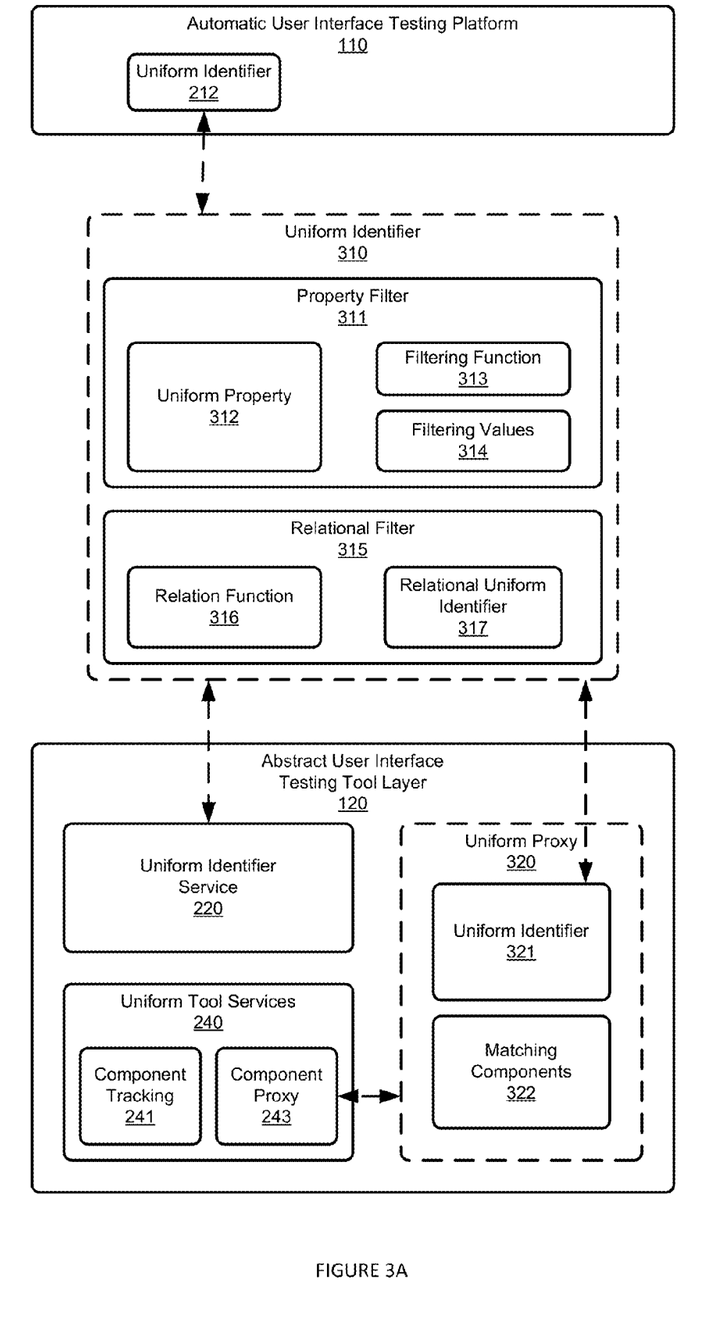
FIG. 3A illustrates data structures associated with uniform identifiers.

FIG. 3A illustrates data structures associated with uniform identifiers. In FIG. 3A, the automatic user interface testing platform ("UI testing platform") 110, the uniform identifier 212, the abstract user interface testing tool layer ("abstract layer") 120, the uniform identifier service 220, the uniform tool services 240, the component tracking module 241, and the component proxy module 243 may correspond to their respective counterparts in FIG. 1 and/or FIG. 2. Further, the uniform identifier 212, which may be utilized by the UI testing platform 110, the abstract layer 120, and the uniform proxy module 243, may be further illustrated by the uniform identifier 310.

In one embodiment, the uniform identifier 310 may contain one or more property filters 311 and/or one or more relational filters 315. The property filter 311 may be configured with a uniform property 312, a filtering function 313, and one or more filtering values 314. In many situations, a GUI component may be modeled differently by different UI testing tools 130, 140, and 150. For example, a GUI attribute (e.g., a text string) of a GUI component may be referred to as "label", "caption", or "text" by different UI testing tools. To decouple the UI testing platform 110 from knowing these specific names used by the UI testing tools, the abstract layer 120 may define a common and uniform property 312 for this GUI attribute. Thus, the uniform property 312 may be deemed defined and supported by the abstract layer 120.

In one embodiment, the uniform property 312 may be a value selected from a set of supported properties defined by the abstract layer 120. The set of supported properties may include, without limitation, "TEXT", "VALUE", "X", "Y", "H", "W", "IMG", "ID", and "CLS". For example, "TEXT" may represent a user-visible text displayed by a GUI component having a label, a caption, or a label sub-component. "VALUE" may represent a user-changeable property of a GUI component which can be used to select/set a value from a list-box or a check-box. "X" or "Y" may represent the x or y screen coordinate of the upper-left corner of a GUI component. "H" or "W" may represent the height or width of a GUI component. "IMG" may represent a graphic image of a GUI component. "ID" may represent a non-visible fixed unique property for a GUI component. And "CLS" may represent a non-visible fixed property that is associated with the intrinsic class name of a GUI component.

In one embodiment, the filtering function 313 in the property filter 311 may be based on a set of supported functions defined by the abstract layer 120. The supported functions may include, without limitation, mathematical comparisons such as "=", ">", "<"; mathematical functions such as "sum", "max"; text functions such as "contained". The filtering values 314 in the property filter 311 may store information provided by the UI testing platform 110 and used along with the uniform property 312 and the filtering function 313. Thus, the property filter 311 may define a filtering condition, and any GUI component that can satisfy the filtering condition may be deemed identified by the uniform identifier 310.

In one embodiment, once the UI testing platform 110 populates the uniform propriety 312, the filtering function 313, and the filtering value 315 of a specific uniform identifier 310, the abstract layer 120 may transmit the specific uniform identifier 310 to the component tracking module 241 and/or the component proxy module 243 to identify and take control of one or more GUI components in the GUI. When the UI testing platform 110 supplies the uniform identifier 310 with multiple property filters 311. The multiple property filters may be deemed having an "AND" relationship among themselves. For example, a uniform identifier 310 may have three property filters 311: the first one describing a uniform property "VISIBLE" equaling "true", the second one indicating a uniform property "TEXT" containing "deleted", and the third one providing a uniform property "X" larger than "210". A GUI component may be identified when its properties satisfy the filtering conditions in these three property filters 311.

In one embodiment, the uniform identifier 310 may contain one or more relational filters 315. In some situations, a second GUI component may be easier to identify from the perspective of a first GUI component than by using a property filter 311 filtering the GUI component's property values. Thus, the UI testing platform 110 may first define a first uniform identifier 310 capable of identifying the first GUI component, and then define a second uniform identifier 310 having a relational filter 315 which describes a relationship between the first GUI component and the second GUI component. The UI testing platform 110 may store the relationship in a relation function 316 of the relational filter 315, and store the first uniform identifier 310 in the relational uniform identifier 317 of the relational filter 315.

In one embodiment, similar to the filtering function 313, the relation function 316 may be based on a set of supported functions (e.g., isChildOf, isInColumnOf, isInsideOf, isBelow) defined by the abstract layer 120. For example, a first uniform identifier 310 may have a relational filter 315 with a relation function 316 being "isChildOf", and a relational uniform identifier 317 referencing a second uniform identifier 310. Thus, the component tracking module 241 may search for a first GUI component which has a child-parent relationship with a second GUI component identified by the relational uniform identifier 317. Similarly, a uniform identifier 310 may use a relation filter 315 to identify a first GUI component positioned on the "left" of a second GUI component, "below" a third GUI component, or have properties relative to a fourth GUI component.

In one embodiment, the component proxy module 243 may be configured to manage a uniform proxy 320 for caching information retrieved based on a uniform identifier 321 (having the same structure as the uniform identifier 310). The uniform proxy 320 may serve as a bridge between the uniform identifier 321 and a set of matching GUI components 322 obtained from the current rendering GUI. In other words, the matching components 322 may be the GUI components that match the filtering conditions of the uniform identifier 321. After the uniform proxy 320 is under the control of the component proxy module 243, the abstract layer 120 may offer convenient access to the uniform proxy 320 throughout multiple atomic operations.

In one embodiment, the UI testing platform 110 and/or the abstract layer 120 may utilize the uniform proxy 320 to check for the existence of matching components 322 or a number of the matching components 322. Further, the UI testing platform 110 and/or the abstract layer 120 may access the property values of the matching components 322 associated with the uniform identifier 321, or invoke multiple user actions on the matching components 322. The uniform proxy 320 may also cache a GUI component's property values in the matching components 322 to improve the performance of the abstract layer 120.

In one embodiment, the relational filter 315 of a uniform identifier 310 may be configured to associate a uniform proxy 320 as its relational uniform identifier 317. In this case, the component tracking module 241 may convert the uniform proxy 320 into an equivalent list of property filters 311 for the uniform identifier 310. Specifically, the component tracking module 241 may retrieve property values from the matching components 322 of the uniform proxy 320, in order to construct the property filters 262.

Referring back to FIG. 2. In one embodiment, once a uniform identifier 212 is populated by the UI testing platform 110 with identification information, the UI testing platform 110 may embedded the uniform identifier 212 in a test command and transmit the test command to the abstract test automation interface 230. Based on the test command, the abstract test automation interface 230 may select a specific tool from the common tools 231, the customized tools 233, and/or the extension tools 235. The specific tool may then extract the uniform identifier 212 from the test command, and transmit the uniform identifier 212 to the uniform tool services 240. Specifically, the specific tool may issue a "get-matching-components-list" command to the component tracking module 241 and/or the component proxy module 243 of the uniform tool services 240. The component tracking module 241 and/or the component proxy module 243 may process the "get-matching-components-list" command using the uniform identifier 212. Upon a complete execution of the "get-matching-components-list" command, if one or more GUI components are identified based on the uniform identifier 212, the component tracking service 241 and/or the component proxy module 243 may continue the processing of the test command based on the one or more GUI components.

In one embodiment, the uniform identifier 212 may contain one or more property filters but no relational filter. In this case, The component tracking service 241 may process the "get-matching-components-list" function by performing one or more of the following steps: A) call a "select-UI-tool-adapter" function to retrieve a UI tool adapter from the UI tool interface 250; B) call a "request-for-candidates" function based on one or more of the property filters in the uniform identifier 212 to receive a "candidate-list"; C) call a "match-property-filter" function by iterating through each candidate in the "candidate-list" using the remaining property filters in the uniform identifier 212; D) remove candidates from the "candidate-list" that do not match any one of the property filters in the uniform identifier 212; and E) return the final "candidate-list" as a "matching-components-list" to the abstract test automation interface 230.

In one embodiment, the uniform identifier 212 may contain one or more property filters and one or more relational filters. In this case, The component tracking service 241 may execute the "get-matching-components-list" function by performing one or more of the following steps: A) call a "convert-relational-filter" function to convert each of the relational filters in the uniform identifier 212 to a property filter and consolidate the property filter into an extended property filter list; B) merge the extended property filter list with the property filters of the uniform identifier 212 to generate a merged property filter list; C) call the uniform identifier service 220 providing the merged property filter list to collect a new uniform identifier 212; D) issue a new "get-matching-components-list" command with the new uniform identifier 212 and collect the returned "matching-components-list"; and E) return the "matching-components-list" to the abstract test automation interface 230. The above mentioned functions may be further described below.

In one embodiment, the uniform tool services 240 may invoke the external tool interface 250 to select a specific tool adapter and its associated UI testing tool for handling some of the "get-matching-components-list" functions. Specifically, the external UI tool interface 250 may be configured to perform a "select-UI-tool-adapter" function for dynamic selection of the UI tool adapter. The select-UI-tool-adapter function may be based on one or more of the following criteria: A) a type of the command to be processed; B) the uniform identifier and its property filters; C) current runtime environment variables (e.g., browser type/version, OS type/version, etc.); D) the available UI tool adapters that can handle the command processing; and/or E) predefined static rules for prioritization. The select-UI-tool-adapter function may finish its operations by either F) returning a selected UI tool adapter, or G) throw exceptions for error situations.

In one embodiment, once a tool adapter is selected, the selected tool adapter may perform a "request-for-candidates" function using the uniform identifier 212. Specifically, the selected tool adapter may be configured to perform the "request-for-candidates" function based on zero, one, or more property filters in the uniform identifier 212. The "request-for-candidates" function may include one or more of the following steps: A) choose a strategy for GUI components enumeration; B) iterate through the GUI components for potential candidate GUI components; C) for a current GUI component selected from the GUI components, apply each of the property filters to the "match-property-filter" function; D) if all of the provided property filters yield "true" result, then add the current GUI component to the candidate list; E) return empty list if no GUI component matched all property filters simultaneously; and F) return the accumulated candidate list. Thus, upon its completion, the "request-for-candidates" function may identify one or more GUI components that satisfy the one or more property filters. The "match-property-filter" function is further described below.

In one embodiment, the selected tool adapter may be configured to perform a "match-property-filter" function on a current GUI component for each of the property filters in the uniform identifier. The "match-property-filter" function may include one or more of the following steps: A) invoke "retrieve-property-value" on the current GUI component using the uniform property in the property filter to collect the property value; B) compare the collected property value based on the filtering values and the filtering function in the property filter; and C) return "true" if comparison is successful, or "false" if otherwise. The "retrieve-property-value" function is further described below.

In one embodiment, the "get-matching-components-list" function, which may be implemented by the component tracking service 241, and the "request-for-candidates" function, which may be implemented by the selected tool adapter, may selectively share the utilizations of the property filters in the uniform identifier 212 in identifying GUI components. Specifically, the selected tool adapter may pick one or some of the property filters from all the property filters in the uniform identifier 212 based on its specific "native" knowledge about the UI test tool associated with the selected tool adapter. Afterward, the selected tool adapter may perform the "request-for-candidates" function based on the picked one or some of the property filters, and obtain a subset of GUI components. The component tracking service 241 may then continue the "get-matching-components-list" function, and filter the subset of GUI component utilizing the rest of the property filters in the uniform identifier 212 that are not "picked" by the selected tool adapter, in order to obtain the "matching-components-list" result.

In one embodiment, the "get-matching-components-list" function may "complement" the "request-for-candidates" function in choosing the property filters. Since the selected tool adapter and its associated UI testing tool may have a higher efficiency in filtering the GUI components, to improve performance, the selected tool adapter may try to utilize as many property filters, if not all, in the uniform identifier as possible. Thus, if the "request-for-candidates" function manages to apply all of the uniform identifier 212's property filters, then the "get-matching-components-list" function may not perform any additional filtering, and may simply forward the list of GUI components received from the "request-for-candidates" function as the "matching-components-list" result. If the "request-for-candidates" function utilizes only part of the property filters, the "get-matching-components-list" function may then use its generic approach of extracting properties from each of the short-listed candidates and applying the remaining property filters on them to complete the filtering process. Thus, both functions may work together to maximize both performance and component access.

In one embodiment, the selected tool adapter may be configured to perform a "retrieve-property-value" function on a current GUI component based on a uniform property. The "retrieve-property-value" function may include one or more of the following steps: A) call "translate-property" function with the uniform property to receive a native property; B) retrieve the property value for the native property from the current GUI component; C) throw an exception when the retrieval fails; and D) return the property value. For example, once a uniform property "VISIBLE" is translated to a native property "visible" for a button GUI component, the retrieve-property-value function may extract a value "true" from the button GUI component. In one embodiment, the selected tool adapter may invoke multiple retrieve-property-value functions as a group of actions within one atomic operation. The "retrieve-property" function is further described below.

In one embodiment, the selected tool adapter may be configured to perform a "translate-property" function based on a uniform property. The "translate-property" function may include one or more of the following steps: A) extract and evaluate the native types of the GUI components in the GUI; B) extract and evaluate current environment variables; C) extract and evaluate current GUI rendering values; D) consider the native properties supported by the associated UI testing tool; E) throw exception when translation is not supported; and F) return a native property that matches the provided uniform property. For example, the translate-property function may translate a uniform property "TEXT" to a native property "text" for a text edit GUI component, or to a native property "label" for a list item GUI component.

In one embodiment, the component tracking module 241 may be configured to perform the "convert-relational-filter" function based on one relational filter. The "convert-relational-filter" function may include one or more of the following steps: A) extract the uniform identifier from the relational filter and call the "get-uniform-proxy" function using the uniform identifier to create a new uniform proxy for the related component; B) pass the uniform proxy of the related component to the relation function to collect a list of property filters; and F) return the list of property filters. The "get-uniform-proxy" function is further described below.

In one embodiment, the component proxy module 243 may be configured to perform a "get-uniform-proxy" function based on a uniform identifier 212. The "get-uniform-proxy" function may include one or more of the following steps: A) create a new uniform proxy; B) assign the provided uniform identifier to the new uniform proxy; C) call the "get-matching-components-list" function providing the uniform identifier as parameter and collecting the "matching-components-list"; D) assign the "matching-components-list" to the created new uniform proxy; and E) return the new uniform proxy.

In one embodiment, the component proxy module 243 may be configured to perform a "get-restricted-uniform-proxy" function based on an existent uniform proxy and one or more additional property filters. The "get-restricted-uniform-proxy" function may include one or more of the following steps: A) create a new uniform proxy; B) retrieve an existent uniform identifier from the previously available uniform proxy; C) use the uniform identifier service 210 to create a new uniform identifier from the existent uniform identifier and the additional filters provided as parameters; D) assign the new uniform identifier to the new uniform proxy; E) utilizing the "matching-components-list" function of the existent uniform proxy, apply the new property filters provided as parameter and generate the new "matching-components-list" for the new uniform proxy; and F) return the new uniform proxy. In some situations, as the existent uniform proxy may be "cached", there is little or no need to access any UI testing tool during the performing of the "get-restricted-uniform-proxy" function. Thus, the "get-restricted-uniform-proxy" function may provide an efficient approach in the testing of composite GUI components such as grid, tree, etc.

In one embodiment, the user input service module 245 may request a selected tool adapter to simulate one or more "mouse-actions", "keyboard-actions", and/or "input-device-x-actions". The selected tool adapter may be configured to handle a sequence of "mouse-actions" on a current GUI component based on one or more mouse action parameters. A sequence of "mouse-actions" may include, without limitation, one or more of the following steps: A) execute a mouse-button action on the current GUI component; B)

execute a mouse-move action on a requested screen-point; C) execute special keyboard actions to support a special mouse action. For example, some mouse-action commands may be configured to simulate a left-click on a GUI component, a pressing of a key "Shift" and the right mouse button, and a drag-n-drop with the current GUI component.

In one embodiment, the selected tool adapter may be configured to handle a sequence of "keyboard-actions" on a current GUI component based on one or more keyboard action parameters. A sequence of "keyboard-actions" may include, without limitation, one or more of the following steps: A) set the key-typing focus to the current GUI component; B) type a sequence of keys; C) press and hold a special key to support a key combination; D) release the special key to complete the key combination; E) send text content to the system clipboard; and F) retrieve the text content from the system clipboard. For example, some keyboard-actions may be configured to simulate typing some text, pressing a key combination "Shift-Alt-z", sending the text to the system clipboard, and pressing key combination "Ctrl-v."

In one embodiment, the selected tool adapter may be configured to handle a sequence of "input-device-x-actions" on a current GUI component based on one or more device-x action parameters. The sequence of "input-device-x-actions" may allow simulation of one or more user-component interactions through the input device "X". Examples of such input devices may include touch screens, and 3D user interaction interfaces.

Figure 3B:
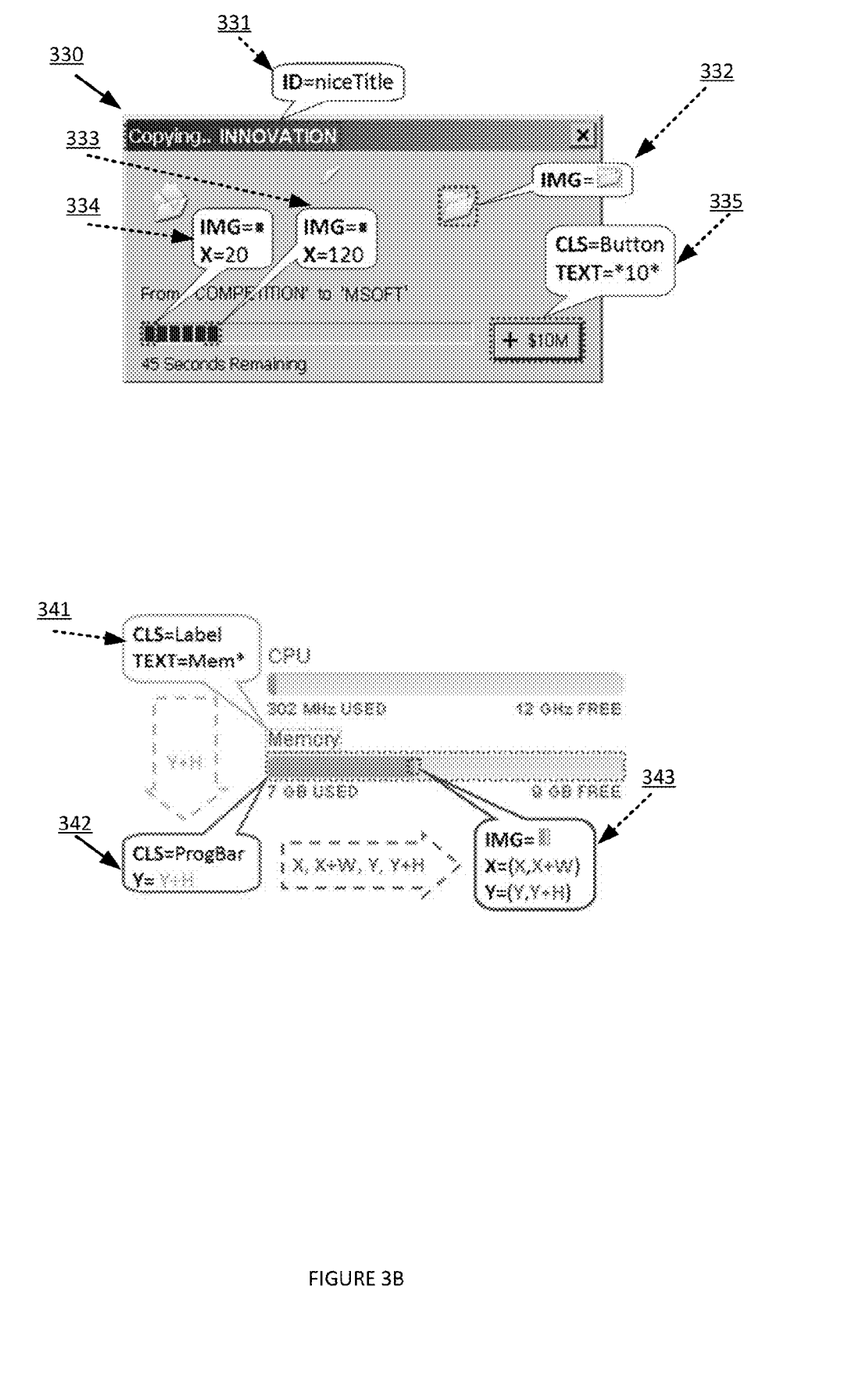
FIG. 3B illustrates scenarios in which one or more uniform identifiers may be used to identify one or more GUI components.

FIG. 3B illustrates scenarios in which one or more uniform identifiers may be used to identify one or more GUI components. In FIG. 3B, a GUI 330 may contain multiple GUI components. An abstract layer may utilize one or more uniform identifiers to identify these GUI components. For example, a uniform identifier 331, which may be used to identify the "title" GUI component of the GUI 330, may have a property filter "ID=niceTitle", which has a uniform property "ID", a filtering condition "=", and a filtering value "niceTitle." Likewise, the uniform identifier 332 may have a property filter to filter based on a graphic image, the property filter having a uniform property "IMG", a filtering function "=", and a filtering value being an uploaded graphic image.

In one embodiment, the uniform identifier 333 may contain two property filters, one describing a filtering condition for a uniform property "IMG", and the second one describing a filtering condition for a uniform property "X." To identify the GUI component referenced by the uniform identifier 333, a component tracking module of the abstract layer may invoke the "get-matching-components-list" function with the uniform identifier 333. The component tracking module may then call the "select-UI-tool-adapter" function with uniform identifier 333. In the "select-UI-tool-adapter" function, an external tool interface may recognize (based on the "IMG" property filter) that a UI testing tool having image recognition capability is needed, and select an appropriate tool adapter accordingly. The selected tool adapter may call the "request-for-candidates" function with the "IMG"-based property filter. The "request-for-candidates" function may return from a selected UI testing tool a candidate-list with 6 entries of GUI components. Afterward, the component tracking module may call the "match-property-filter" function using the selected tool adapter for each of the 6 candidate components, passing the "X=120" property filter as one parameter. As the right-most candidate component may be the only GUI component that matches the "X=120" property filter, the other candidate components may be removed from the candidate list, and a matching component list with the right-most candidate component may be returned as a response to the "get-matching-components-list" function. In other words, the uniform identifier 333 may be used to identify the right-most graphic block in a progress bar.

In one embodiment, the uniform identifier may use regular expression or mathematic function as filtering functions. For example, the uniform identifier 335 may have two property filters, one property filter checking whether the uniform property "CLS" of the GUI component is equal to "Button", the other property filter evaluating whether the uniform property "TEXT" matches the regular expression of "*10*". Thus, if there is a button in the GUI 330 which has "10" contained in its label, then the button may be deemed to have been identified by the uniform identifier 335. Further, the property filter may use approximation for number evaluation. For example, a property filter may check whether the Y-position of a GUI component is within proximity of a target position value.

In one embodiment, the uniform identifier 343 may have one property filter based on a uniform property "IMG" and one relational filter having a relation function "inside-of" and a relational uniform identifier referring to the uniform identifier 342. The uniform identifier 342 may have one property filter based on a uniform property "CLS" and one relational filter having a relation function "below-of" and a relational uniform identifier referring to the uniform identifier 341. And the uniform identifier 341 may have two property filters based on uniform properties "CLS" and "TEXT".

To identify a GUI component using the uniform identifier 343, the component tracking module may invoke the "get-matching-components-list" function using the uniform identifier 343 as a parameter, expecting to receive a "matching-components-list." The component tracking module may then invoke the "convert-relational-filter" function using the "inside-of" relational filter from the uniform identifier 343, expecting a first list of property filters. The component tracking module may further invoke the "get-uniform-proxy" function, with the uniform identifier 342 retrieved from the relational filter "inside-of" as a parameter, expecting a first uniform proxy. In one embodiment, the component tracking module may then invoke the "convert-relational-filter" function using the "below-of" relational filter from the uniform identifier 342, expecting a second list of property filters. Likewise, the component tracking module may further invoke the "get-uniform-proxy" function, with the uniform identifier 341 retrieved from the relational filter "below-of" as a parameter, expecting a second uniform proxy.

In one embodiment, the component tracking module may invoke the "get-matching-components-list" function, with the uniform identifier 341 as a parameter, and collects a "matching-components-list" having one GUI component (with a label "Memory"). A component proxy module may create a new uniform proxy, and assign the uniform identifier 341 and the collected "matching-components-list" to the new uniform proxy. The new uniform proxy may be deemed the second uniform proxy mentioned above. Afterward, the component tracking module may utilize the new uniform proxy to retrieve the "Y" and the "H" property values (e.g. 200 and 12) of the wrapped GUI component, and construct a list of one property filter "Y=212". The list of property filters may be deemed the second list of property filters mentioned above.

In one embodiment, the component tracking module may merge the property filter "Y=212" and the property filter of uniform identifier 342 "CLS=ProgBar" into a merged property filter list. The merged property filter list may be passed to the uniform identifier service 220 in order to generate a new temporary uniform identifier T1. The component tracking module may then invoke the "get-matching-components-list" function, with the temporary uniform identifier T1 as a parameter, and generate a "matching-components-list" with one GUI component (the progress bar below the "Memory" label). Afterward, the component proxy module may create another new uniform proxy by assigning the temporary uniform identifier T1 and the "matching-components-list" generated above. The new uniform proxy may be deemed the first uniform proxy mentioned above.

In one embodiment, the component tracking module may utilize the first uniform proxy to retrieve the "X", "Y", "W" and the "H" property values (e.g. 100, 212, 200 and 30) of the wrapped GUI component, and construct a list of two property filters "X_between_100_and_300" and "Y_between_212_and_242". The list of two property filters may be deemed the first list of property filters mentioned above. Thus, the component tracking module may merge the returned property filters "X_between_100_and_300" and "Y_between_212_and_242" with the property filter of uniform identifier 343 "IMG=<image>" into a merged property filter list, then passes this merged property filter list to the uniform identifier service 210 in order to collect another temporary uniform identifier T2. Finally, the component tracking module may invoke the "get-matching-components-list" function with the uniform identifier T2 as a parameter, and collects a "matching-components-list" with one GUI component (the progress bar separator of the progress bar below the "Memory" label). This GUI component may be deemed identified by the uniform identifier 343.

In other words, the above identification process based on the uniform identifier 343 may be summarized into the following steps: A) use the uniform identifier 341 to identify a first list of GUI components; B) generate the "second uniform proxy" based on the uniform identifier 341 and the first list of GUI components; C) use the "second uniform proxy" to generate the property filter "Y=212"; D) generate the "temporary uniform identifier T1" with the property filters "Y=212" and "CLS=ProgBar"; E) use the "temporary uniform identifier T1" to identify a second list of GUI components; F) generate the "first uniform proxy" based on the "temporary uniform identifier T1" and the second list of GUI components; G) use the "first uniform proxy" to generate the list of two property filters "X_between_100_and_300" and "Y_between_212_and_242"; H) generate the "temporary uniform identifier T2" with the property filters "X_between_100_and_300" and "Y_between_212_and_242", and "IMG=<image>"; I) use the "temporary uniform identifier T2" to identify a third list of GUI components which contain the identified GUI component.

Thus, the abstract layer 120 may bring the advantages of script-based UI tools to high-level PL. By utilizing a high-level PL, the UI testing platform 110 may be more reliable, highly scalable, and have high code reusability. The high-level PL may also be better in handling complex algorithms and data structures, as well as in supporting advanced UI technologies. Thus, the high-level PL is suitable for testing big and complex system implemented using multiple technologies. At the same time, by utilizing the abstract layer 120, the UI testing platform 110 may enable code portability and code reusability, which may reduce time and resource in providing reliable and repeatable test executions.

Figure 4:
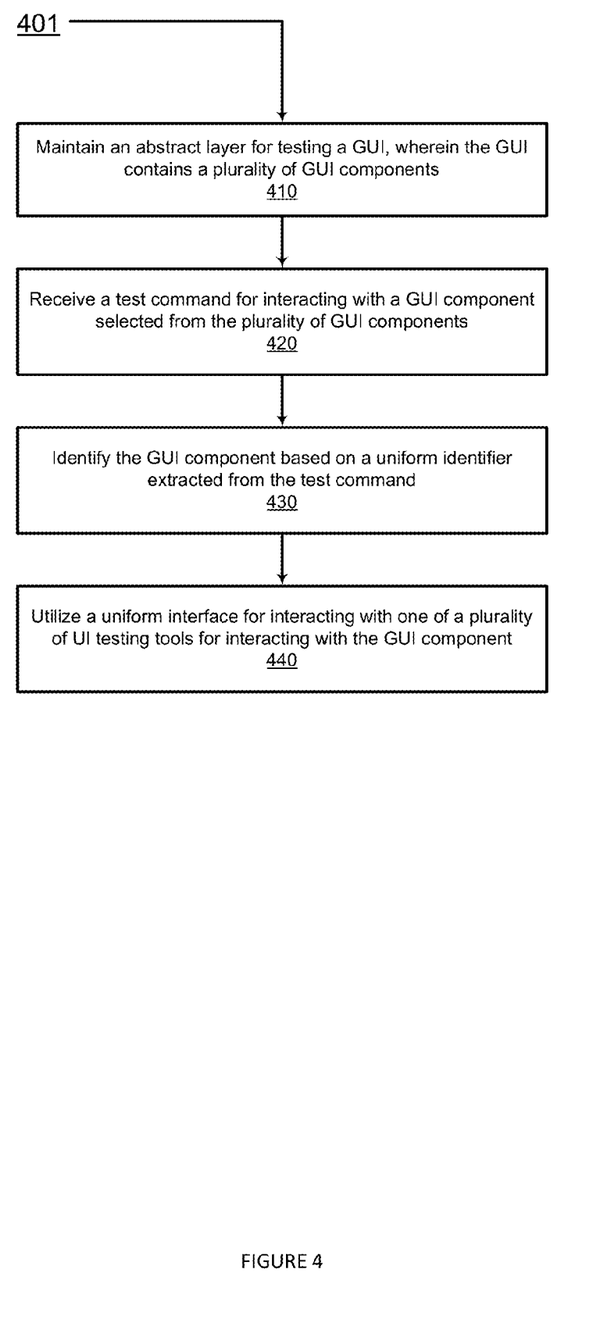
FIG. 4 shows a flow diagram illustrating one example process for performing automatic testing of a graphical user interface.

FIG. 4 shows a flow diagram illustrating one example process 401 for performing automatic testing of a graphical user interface, according to some embodiments of the present disclosure. The process 401 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations.

At block 410, a UI testing platform of an automatic testing system may be configured to maintain an abstract layer for testing a GUI having a plurality of GUI components. Each of the UI testing tools may be configured to interact with one or more of the plurality of GUI components to perform automatic testing of the GUI.

At block 420, the UI testing platform may issue a test command to the abstract layer for the testing of a GUI component selected from the plurality of GUI components in the GUI. The UI testing platform may obtain a first uniform identifier from the abstract layer, and embed the first uniform identifier in the test command. The abstract layer may receive the test command which is configured to simulate a user action performed on a GUI component selected from the plurality of GUI components.

At block 430, the abstract layer may extract the first uniform identifier from the test command, and select a UI testing tool from the plurality of UI testing tools for interacting with the GUI component. The abstract layer may be configured to dynamically identify the GUI component from the plurality of GUI components based on the first uniform identifier.

In one embodiment, the first uniform identifier may contain a first property filter having a corresponding filtering function and a corresponding filtering value. The abstract layer may obtain a first subset of GUI components that satisfy the first property filter by filtering the plurality of GUI components using the corresponding filtering function and the corresponding filtering value in the first property filter. The GUI component to be identified may be in the first subset of GUI components.

In one embodiment, in additional to the first property filter, the first uniform identifier may further contain a second property filter having a corresponding filtering function and a corresponding filtering value. In this case, the abstract layer may obtain a second subset of GUI components that satisfy the second property filter by filtering the first subset of GUI components using the corresponding filtering function and the corresponding filtering value in the second property filter. Afterward, the GUI component to be identified may be in the second subset of GUI components.

In one embodiment, the first uniform identifier may include a first relational filter having a corresponding relation function and a corresponding relational uniform identifier. The abstract layer may convert the relational filter to a first property filter based on the corresponding relation function and the corresponding relational uniform identifier in the first relational filter. The abstract layer may then obtain the GUI component from the plurality of GUI components by filtering the plurality of GUI components using the first property filter.

In one embodiment, in addition to the first relational filter, the first uniform identifier may further contain a second property filter having a corresponding relation function and a corresponding relational uniform identifier. The abstract layer may generate a second uniform identifier based on the first property filter and the second property filter, and identify the GUI component from the plurality of GUI components using the second uniform identifier.

In one embodiment, the first uniform identifier may contain a first relational filter having a corresponding relation function and a corresponding relational uniform identifier. The abstract layer may generate a uniform proxy based on a second GUI component identified from the plurality of GUI components using the corresponding relational uniform identifier. The abstract layer may generate a second property filter based on a property value extracted from the uniform proxy. The abstract layer may then obtain the GUI component from the plurality of GUI components by filtering the plurality of GUI components using the second property filter.

At block 440, the abstract layer may be configured to utilize a uniform interface to communicate with the selected UI testing tool for interacting with the GUI component based on the test command.

Figure 5:
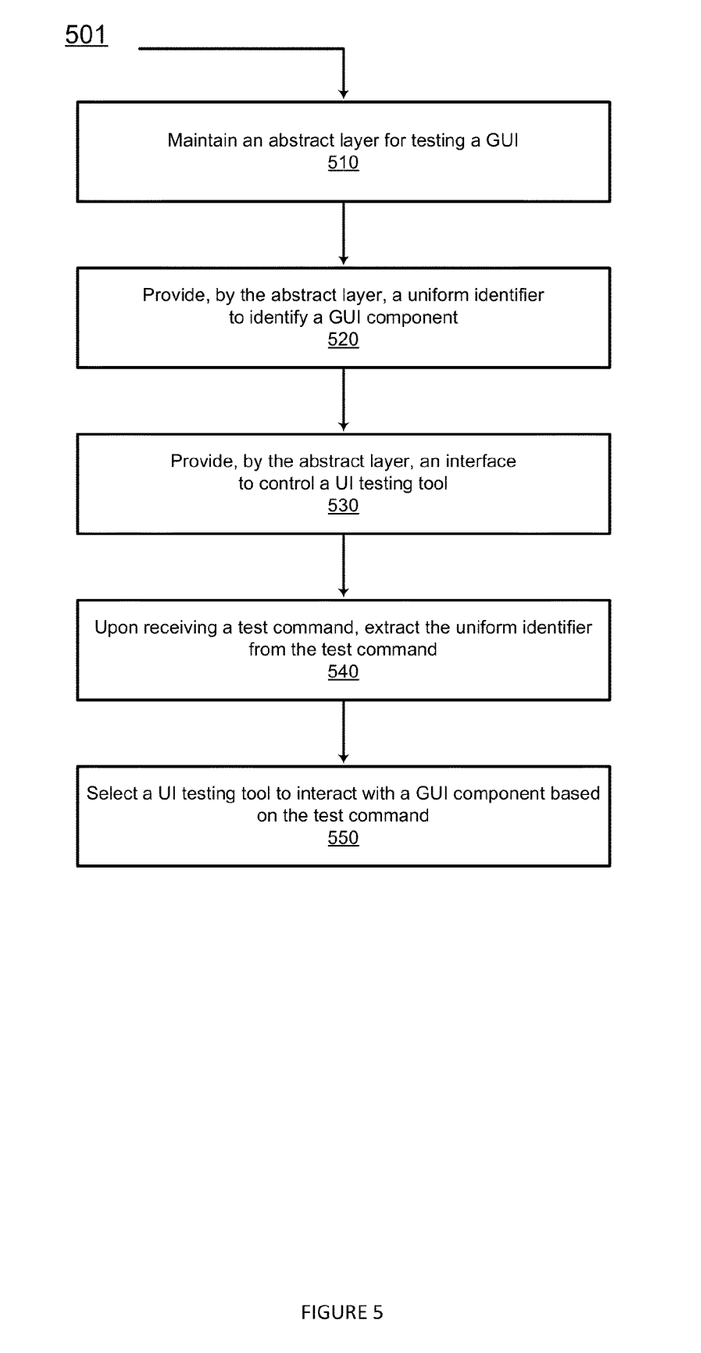
FIG. 5 shows a flow diagram illustrating one example process for providing an abstract layer for automatic user interface testing, all arranged in accordance to at least some embodiments of the present disclosure.

FIG. 5 shows a flow diagram illustrating one example process 501 for providing an abstract layer for automatic user interface testing, according to one embodiment of the present disclosure. The process 501 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations.

At block 510, a UI testing platform in an automatic user interface testing system may be configured to maintain an abstract layer for testing a GUI. The GUI may contain a plurality of GUI components. At block 520, the abstract layer may be configured to provide a uniform identifier to identify one of the plurality of GUI components. The UI testing platform may utilize the uniform identifier to issue test commands for the testing of the specific GUI component identified by the uniform identifier. At block 530, the abstract layer may be configured to provide a uniform interface for access a plurality of user interface (UI) testing tools. Each of the plurality of UI testing tools may be configured to interact with one or more of the plurality of GUI components.

At block 540, the UI testing platform may be configured to issue a test command for interacting with a GUI component selected from the plurality of GUI components. The test command may contain a specific uniform identifier for identifying the GUI component. Upon receiving the test command from the UI testing platform, the abstract layer may be configured to extract the uniform identifier from the test command. At block 550, the abstract layer may be configured to select a UI testing tool from the plurality of UI testing tools for handling the test command. The UI testing tool may then locate the GUI component from the GUI based on the uniform identifier, and perform automatic testing operations on the GUI component.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

Systems and methods for managing code review have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, virtual machines, and the like.

One or more embodiments of the present disclosure may be implemented as one or more computer programs or as one or more computer program modules embodied in one or more computer readable media. The term computer readable storage medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system having a processor configured to provide automatic testing of a graphical user interface (GUI) having a plurality of GUI components, the system comprising:
   a plurality of user interface (UI) testing tools executing on a computer system, wherein each of the plurality of UI testing tools is configured to interact with one or more of the plurality of GUI components to perform automatic testing of the GUI;
   an abstract layer coupled with the plurality of UI testing tools, wherein the abstract layer is configured to provide a uniform interface for accessing the plurality of UI testing tools; and
   an automatic test platform coupled with the abstract layer, wherein:
   the automatic test platform is configured to issue a test command to the abstract layer simulating a user action performed on a GUI component of the plurality of GUI components; and
   the abstract layer is configured to:
      select one of the plurality of UI testing tools based on the test command and identify the GUI component based on a first uniform identifier in the test command, wherein the first uniform identifier further comprises a relational filter containing a relation function and a relational uniform identifier;
      utilize the first uniform identifier to communicate with the selected UI testing tool for interacting with the GUI component;
      convert the relational filter into a property filter; and
      identify the GUI component using a filtering function and a filtering value contained in the property filter.

2. The system of claim 1, wherein the first uniform identifier comprises:
   the property filter wherein the abstract layer is configured to identify the GUI component by filtering the plurality of GUI components using the filtering function and the filtering value in the property filter.

3. The system of claim 2, wherein the first uniform identifier further comprises:
   a uniform property associated with a native property of the GUI component, wherein the abstract layer is configured to translate the uniform property to the native property for the identification of the GUI component.

4. The system of claim 1,
   wherein the abstract layer is configured to identify the GUI component by filtering the plurality of GUI components using the relation function and a second GUI component identified by the relational uniform identifier.

5. The system of claim 4, wherein the abstract layer is further configured to:
   generate a second uniform identifier based on the relational filter and a second property filter in the first uniform identifier; and
   identify the GUI component using the second uniform identifier.

6. The system of claim 1, further comprising:
   a uniform proxy coupled with the first uniform identifier, wherein the uniform proxy is configured to store the first uniform identifier and the GUI component during a first atomic operation, and the abstract layer is configured to retrieve property values associated with the GUI component during a second atomic operation subsequent to the first atomic operation.

7. A method to provide automatic testing of a graphical user interface (GUI) having a plurality of GUI components, comprising:
   interacting, by a plurality of user interface (UI) testing tools, with one or more of the plurality of GUI components to perform automatic testing of the GUI;
   providing, by an abstract layer coupled with the plurality of UI testing tools, a uniform interface for accessing a plurality of user interface (UI) testing tools;
   issuing, by an automatic test platform coupled with the abstract layer, a test command to simulate a user action performed on a GUI component of the plurality of GUI components;
   selecting, by the abstract layer, one of the plurality of UI testing tools based on the test command and identifying the GUI component based on a first uniform identifier in the test command, wherein the first uniform identifier further comprises a relational filter containing a relation function and a relational uniform identifier;
   utilizing, by the abstract layer, the first uniform identifier to communicate with the selected UI testing tool for interacting with the GUI component;
   converting, by the abstract layer, the relational filter into a first property filter; and
   identifying, by the abstract layer, the GUI component using a filtering function and a filtering value contained in the first property filter.

8. The method of claim 7, wherein the identifying the GUI component comprises filtering the plurality of GUI components using the filtering function and the filtering value in the first property filter, and the first uniform identifier comprises the first property filter.

9. The method of claim 8, further comprising translating a uniform property to a native property for the identification of the GUI component, wherein the first uniform identifier further comprises the uniform property.

10. The method of claim 7, wherein the identifying the GUI component comprises filtering the plurality of GUI components using the relation function and a second GUI component identified by the relational uniform identifier.

11. The method of claim 10, further comprising:
    generating a second uniform identifier based on the relational filter and a second property filter in the first uniform identifier; and
    identifying the GUI component using the second uniform identifier.

12. The method of claim 7, further comprising storing the first uniform identifier and the GUI component during a first atomic operation, and retrieving property values associated with the GUI component during a second atomic operation subsequent to the first atomic operation.

13. A non-transitory machine readable storage medium embodying computer software, the computer software causing a computer to perform a method to provide automatic testing of a graphical user interface (GUI) having a plurality of GUI components, the method comprising:
    interacting, by a plurality of user interface (UI) testing tools, with one or more of the plurality GUI components to perform automatic testing of the GUI;

providing, by an abstract layer coupled with the plurality of UI testing tools, a uniform interface for accessing a plurality of user interface (UI) testing tools;

issuing, by an automatic test platform coupled with the abstract layer, a test command to simulate a user action performed on a GUI component of the plurality of GUI components;

selecting, by the abstract layer, one of the plurality of UI testing tools based on the test command and identify the GUI component based on a first uniform identifier in the test command, wherein the first uniform identifier further comprises a relational filter containing a relation function and a relational uniform identifier;

utilizing, by the abstract layer, the first uniform identifier to communicate with the selected UI testing tool for interacting with the GUI component;

converting, by the abstract layer, the relational filter into a first property filter; and identifying, by the abstract layer, the GUI component using a filtering function and a filtering value contained in the first property filter.

14. The non-transitory machine readable storage medium of claim 13, wherein the identifying the GUI component comprises filtering the plurality of GUI components using the filtering function and the filtering value in the first property filter, and the first uniform identifier comprises the first property filter.

15. The non-transitory machine readable storage medium of claim 14, wherein the method further comprises translating a uniform property to a native property for the identification of the GUI component, and the first uniform identifier further comprises the uniform property.

16. The non-transitory machine readable storage medium of claim 13, wherein the identifying the GUI component comprises filtering the plurality of GUI components using the relation function and a second GUI component identified by the relational uniform identifier.

17. The non-transitory machine readable storage medium of claim 16, wherein the method further comprises:

generating a second uniform identifier based on the relational filter and a second property filter in the first uniform identifier; and identifying the GUI component using the second uniform identifier.

18. The non-transitory machine readable storage medium of claim 13, wherein the method further comprises storing the first uniform identifier and the GUI component during a first atomic operation, and retrieving property values associated with the GUI component during a second atomic operation subsequent to the first atomic operation.

* * * * *